(12) United States Patent
Huang et al.

(10) Patent No.: US 7,076,108 B2
(45) Date of Patent: Jul. 11, 2006

(54) APPARATUS AND METHOD FOR IMAGE/VIDEO COMPRESSION USING DISCRETE WAVELET TRANSFORM

(76) Inventors: Gen Dow Huang, 13925 Saddleview Dr., North Potomac, MD (US) 20878; Yu-shen Cheng, F-16-5, No. 398 Han-Pei Rd., Chung-Li (TW)

( * ) Notice: Subject to any disclaimer, the term of this patent is extended or adjusted under 35 U.S.C. 154(b) by 709 days.

(21) Appl. No.: 10/135,536

(22) Filed: May 1, 2002

(65) Prior Publication Data

US 2003/0108248 A1    Jun. 12, 2003

Related U.S. Application Data

(60) Provisional application No. 60/338,673, filed on Dec. 11, 2001.

(51) Int. Cl.
*G06K 9/46* (2006.01)

(52) U.S. Cl. ............ 382/240; 382/166; 382/245

(58) Field of Classification Search ........ 382/240, 382/243, 248, 166, 232, 238, 250, 237, 245; 348/395.1; 375/240.21, 240.11; 704/230, 704/503; 341/63
See application file for complete search history.

(56) References Cited

U.S. PATENT DOCUMENTS

| | | | | |
|---|---|---|---|---|
| 5,808,683 | A * | 9/1998 | Tong et al. | 375/240.11 |
| 6,125,201 | A * | 9/2000 | Zador | 382/166 |
| 6,182,034 | B1 * | 1/2001 | Malvar | 704/230 |
| 6,223,162 | B1 * | 4/2001 | Chen et al. | 704/503 |
| 6,256,608 | B1 * | 7/2001 | Malvar | 704/230 |
| 6,300,888 | B1 * | 10/2001 | Chen et al. | 341/63 |
| 6,516,096 | B1 * | 2/2003 | Yokose et al. | 382/248 |
| 6,643,406 | B1 * | 11/2003 | Hajjahmad et al. | 382/240 |
| 6,778,709 | B1 * | 8/2004 | Taubman | 382/240 |
| 6,895,121 | B1 * | 5/2005 | Joshi et al. | 382/243 |

FOREIGN PATENT DOCUMENTS

JP    02000236548 A  *  8/2000

OTHER PUBLICATIONS

Crouse et al., "Joint Thresholding and Quantizer Selection for Transform Image Coding: Entropy-Constrained Analysis and Applications to Baseline JPEG", IEEE, vol. 6, No. 2, Feb. 1997, pp. 285-297.*

* cited by examiner

*Primary Examiner*—Anh Hong Do
(74) *Attorney, Agent, or Firm*—Reed Smith LLP; Stanley P. Fisher, Esq.; Juan Carlos A. Marquez, Esq.

(57) ABSTRACT

The inventions provides a method for compressing image data comprising the steps of: performing a color transformation of the data; wavelet-transforming the color-transformed data via division and multiplication operations being substituted with six lookup tables in order to provide a series of wavelet coefficients in different levels of wavelet transformation subbands; quantizing in accordance with a special equation the wavelet coefficients which fall above a predetermined threshold value to provide a series of quantized wavelet coefficients; applying an entropy coding to the quantized wavelet coefficients with a particular Huffman table; and compressing the coded wavelet coefficients to provide compressed data.

36 Claims, 10 Drawing Sheets

| Run | Code | Length | Follow by a number of bits | Data representation |
|---|---|---|---|---|
| 0 | 0 | Length ≤ 8 | 0 | 1 single zero |
| 0 | 1111100 | 9 ≤ Length ≤ 10 | 1 | 9 or 10 0's |
| 0 | 11111010 | 11 ≤ Length ≤ 14 | 2 | 11~14 0's |
| 0 | 111110110 | 15 ≤ Length ≤ 22 | 3 | 15~22 0's |
| 0 | 1111101110 | 23 ≤ Length ≤ 38 | 4 | 23~38 0's |
| 0 | 111110111100 | 39 ≤ Length ≤ 70 | 5 | 39~70 0's |
| 0 | 111110111101 | 71 ≤ Length ≤ 134 | 6 | 71~134 0's |
| 0 | 111110111110 | 135 ≤ Length ≤ 262 | 7 | 135~262 0's |
| 0 | 11111011111100 | 263 ≤ Length ≤ 518 | 8 | 263~518 0's |
| 0 | 11111011111101 | 519 ≤ Length ≤ 1030 | 9 | 519~1030 0's |
| 0 | 11111011111110 | 1031 ≤ Length ≤ 2054 | 10 | 1031~2054 0's |
| 0 | 1111110111111100 | 2055 ≤ Length ≤ 4102 | 11 | 2055~4102 0's |
| 0 | 1111110111111101 | 4103 ≤ Length ≤ 8198 | 12 | 4103~8198 0's |
| 0 | 1111110111111110 | 8199 ≤ Length ≤ 16390 | 13 | 8199~16390 0's |
| 0 | 1111110111111111 | 16391 ≤ Length ≤ 32774 | 14 | 16391~32774 0's |
| -1 | 100 | | 0 | |
| 1 | 101 | | 0 | |
| -2 | 1100 | | 0 | |
| 2 | 1101 | | 0 | |
| -3 | 11100 | | 0 | |
| 3 | 11101 | | 0 | |
| -4 | 111100 | | 0 | |
| 4 | 111101 | | 0 | |
| ±5 | 111111000 | | 1 | ±5 |
| ±6, ±7 | 111111001 | | 2 | ±6, ±7 |
| ±(8~11) | 111111010 | | 3 | ±(8~11) |
| ±(12~19) | 111111011 | | 4 | ±(12~19) |
| ±(20~35) | 111111100 | | 5 | ±(20~35) |
| ±(36~67) | 111111101 | | 6 | ±(36~67) |
| ±(68~131) | 111111110 | | 7 | ±(68~131) |
| ±(132~259) | 111111111 | | 8 | ±(132~259) |

Figure 9.

APPARATUS AND METHOD FOR IMAGE/VIDEO COMPRESSION USING DISCRETE WAVELET TRANSFORM

This application claims the benefit of U.S. Provisional Patent Applications Ser. No. 60/338,673 filed on Dec. 11, 2001, the entire disclosures of which are incorporated herein by reference.

BACKGROUND OF THE INVENTION

1. Field of the Invention

The present invention relates to an image/video compression system, method, and implementation in order to provide a high-speed, high-compression, high-quality, multiple-resolution, versatile, and controllable visual communication system. Specifically, the present invention is directed to a wavelet transform (WT) system for digital data compression in image/video signal processing. Due to a number of considerations and requirements of the visual communication device and system, the present invention is directed to providing a highly efficient image/video compression algorithm, WT Software Implementation, WT Hardware Implementation, and Multiple Resolution Video Conference (Mr. Vconf) methodology for local area multiple-point to multiple-point visual communication.

2. Description of the Related Art

In recent years, visual communications have become an exploding market due to current advances in video/image data compression development, the maturity of telecommunication facilities, and a well developed very large scale integrated (VLSI) technology. A well-developed visual communication system should take into consideration optimizing the processing speed, the versatility of the communication functions, the quality of image/video signals, and the controllability of the overall system. For instance, with regards to the processing speed, a good visual system should be able to process high-resolution video (e.g., 24-bit color with 288×352 resolution) in real time (30 frames per second).

The Joint Photographic Experts Group (JPEG) bitmap compression format is widely adopted for compressing either full-color or gray-scale digital images of "natural", real-world scenes, rather than non-realistic images, such as cartoons or line drawings, black-and-white (1 bit-per-pixel) images or moving pictures. The JPEG color data is stored in values of luminance (brightness) and chrominance (hue). Technically speaking, the image/video compression includes three basic operations: transformation, quantization, and data packing. Usually a signal transformation is used to transform a signal to a different domain, perform some operations (e.g., quantization, and data packing), on the transformed signal and inverse transformation, back to the original domain. The transformed values are quantized or mapped to smaller set of values to achieve compression. In other words, quantization is the operation to sample data by a finite number of levels based on some criteria such as image distortion and compression ratio. The actual data compression divides the image into 8×8 pixel squares (i.e., block processing) and calculates a Discrete Cosine Transform (DCT) for that square. Then the DCT coefficients are quantized and a Variable Length Code compression scheme is applied. The commercially available graphic software packages provide different levels of compression, usually a low to medium level, which is sufficient and economical for web image files sent via modem over a telephone line or when removable media storage capacity is limited. However, when another application demands higher degree of compression, the higher the loss of detail. In particular, the quantization step results in blurring images on sharp edges under a high compression ratio, such as 100:1.

WT (or subband coding or multiresolution analysis) is a better choice than the classical DCT standard JPEG applications in order to faithfully recreate the original images under high compression ratios due to its lossless nature. The lossless nature of WT results in zero data loss or modification on decompression so as to support better image quality under higher compression ratios at low-bit rates and highly efficient hardware implementation. Extensive research in the field of visual compression has led to the development of several successful compression standards such MPEG 4 and JPEG 2000, both of which allow for the use of Wavelet-based compression schemes. WT has been popularly applied to image and video coding applications because of its higher de-correlation WT coefficients and energy compression efficiency, in both temporal and spatial representation. In addition, multiple resolution representation of WT is well suited to the properties of the Human Visual System (HVS).

The principle behind the wavelet transform is to hierarchically decompose the input signals into a series of successively lower resolution reference signals and their associated detail signals. At each level, the reference signals and detailed signals contain the information needed for reconstruction back to the next higher resolution level. One-dimensional DWT (1-D DWT) processing can be described in terms of a filter bank, wavelet transforming a signal is like passing the signal through this filter bank wherein an input signal is analyzed in both low and high frequency bands. The outputs of the different filter stages are the wavelet- and scaling function transform coefficients. A separable two-dimensional DWT process is a straightforward extension of 1-D DWT. Specifically, in the 2-D DWT process, separable filter banks are applied first horizontally and then vertically. The decompression operation is the inverse of the compression operation. Finally, the inverse wavelet transform is applied to the de-quantized wavelet coefficients. This produces the pixel values that are used to create the image.

There are probably as many wavelet transforms as there are wavelets. Due to the infinite variety of wavelets, it is possible to design a transform which maximally exploits the properties of a specific wavelet, such as morlets, coiflets, wavelants, slantlets, brushlets and wavelet packets. The computational complexity of WT is always a concern for industrial applications. Many traditional techniques struggled to balance the transmission time, memory requirements, and the image quality. The WT computation includes two components: lift/scale operations (i.e., lifting) and split/join operations (i.e., rearrangement of sample required as a result of upsampling/downsampling). The lifting scheme of WT is really general yet suitable for experimenting while its in-place and integer properties made it extremely useful for embedded systems when memory was still expensive. For example, U.S. Pat. Pub. No. 2002/0006229 A1 titled "System and Method for Image Compression and Decompression" used integer wavelet transform to simplify the computation at the cost of image quality. As another example, U.S. Pat. Pub. No. 2002/0001413 A1 entitled "Wavelet Transform Coding Technique" evaluates and applies alternative coding modes (depending upon data types such as color, gray scale, text, or graphic) for each image block. By adopting a 2–6 (L-H) wavelet filter and a Haar filter for subband decomposition, 11 groups of data are organized into a tree structure and then each coefficient is coded with the same number of bits to control the total number of bits per block under a budgeted number. As the price of memory has significantly reduced, there is no need to complicate the computation operations so as to minimize memory usage. New wavelet architectures designed with little concern for memory are in demand.

U.S. Pat. Pub. No. 2002/0006229 applies a multilevel uniform thresholding method for quantization. The wavelet coefficients are matched against threshold values, and if the values are less than the established threshold values specified, then the resultant value is set to zero. The wavelet coefficients are then quantized to a number of levels depending upon which quadrant is being processed, and the desired compression or quality factor. As mentioned, this quantization essentially scales the wavelet coefficients and truncates them to a predetermined set of integer values rather than using the real numbers with an appropriate number of floating points, which can be very important in image compression to make few coefficients zeros, especially for high spatial frequencies, to maintain better image quality. A quantization that reserves an appreciable number of floating points to improve image quality without incurring overburdening calculations is desired.

The compression ratio is not only affected by the quantization but also the subsequent data packing. In the packing operation, the quantized wavelet coefficients are packed using various techniques including run length coding and Huffman coding to efficiently encode large numbers of zeros in sequences of binary data. To unpack the data requires the lookup of Huffman words, the decoding of the run length codes, and other data packing techniques. The outcome quantized wavelet coefficients are then de-quantized. U.S. Pat. No. 6,124,811 titled "Real Time Algorithms and Architectures for Coding Images Compressed by DWT-Based Techniques" proposed the adaptive run length coding for the blocking strategy in the JPEG standard. The adaptive run length coding incorporates the standard run-length coding with a modified Huffman coding to allow a variable and exceptional large run-length value to be encoded while keeping a fixed length structure. This modification tried to maximize the compression gained during encoding to reduce the storage/transfer memory size required for the image data. The coding architecture, as a whole or a portion, such as the Huffman coding, can be customized for different WT lifting schemes to improve the total system efficiency.

SUMMARY OF INVENTION

According to one aspect of the invention, the method for compressing image data, comprising the steps of: color-transforming the image data to provide color-transformed data; wavelet-transforming the color-transformed data to provide a series of wavelet coefficients in different levels of wavelet transformation subbands; quantizing the wavelet coefficients which fall above a predetermined threshold value to provide a series of quantized wavelet coefficients; applying an entropy coding to the quantized wavelet coefficients to provide coded wavelet coefficients; and compressing the coded wavelet coefficients to provide compressed image data.

According to another aspect of the invention, the method for de-compressing compressed image data, comprising the steps of: de-compressing the compressed image data to provide a series of coded wavelet coefficients; applying an entropy decoding to the coded wavelet coefficients to provide a series of de-coded wavelet coefficients; de-quantizing the de-coded wavelet coefficients to provide a series of de-quantized wavelet coefficients; inversely wavelet-transforming the de-quantized wavelet coefficients in different levels of wavelet transformation subbands to provide color-transformed data; and inversely color-transforming the color-transformed data to provide de-compressed image data.

According to another aspect of the invention, the image data compression/de-compression system having at least one of a data compressor and a data de-compressor, the data compressor comprising: a color transformer for color-transforming image data to provide color-transformed data; a wavelet-transforming means for wavelet-transforming the color-transformed data to provide a series of wavelet coefficients in different levels of wavelet transformation subbands; a quantizer for quantizing the wavelet coefficients which fall above a predetermined threshold value to provide a series of quantized wavelet coefficients; an entropy encoder for entropy encoding the quantized wavelet coefficients to provide coded wavelet coefficients; and a sub-compressor for compressing the coded wavelet coefficients to provide compressed image data. The data de-compressor comprises: a sub-decompressor for de-compressing the compressed image data to provide a series of coded wavelet coefficients; an entropy decoder for entropy decoding the coded wavelet coefficients to provide a plurality of de-coded wavelet coefficients; a de-quantizer for de-quantizing the de-coded wavelet coefficients to provide a series of de-quantized wavelet coefficients; an inverse wavelet transformer for inversely wavelet-transforming the de-quantized wavelet coefficients in different levels of wavelet transformation subbands to provide color-transformed data; and an inverse color transformer for inversely color-transforming the color-transformed data to provide de-compressed image data.

BRIEF DESCRIPTION OF THE DRAWINGS

The advantages of the present invention will become apparent to one of ordinary skill in the art when the following description of the preferred embodiments of the invention is taken into consideration with accompanying drawings where like numerals refer to like or equivalent parts and in which:

FIG. 9 is the Huffman table of the present invention to be applied after the run-length coding.

DETAILED DESCRIPTION OF THE PREFERRED EMBODIMENTS

Figure 1:
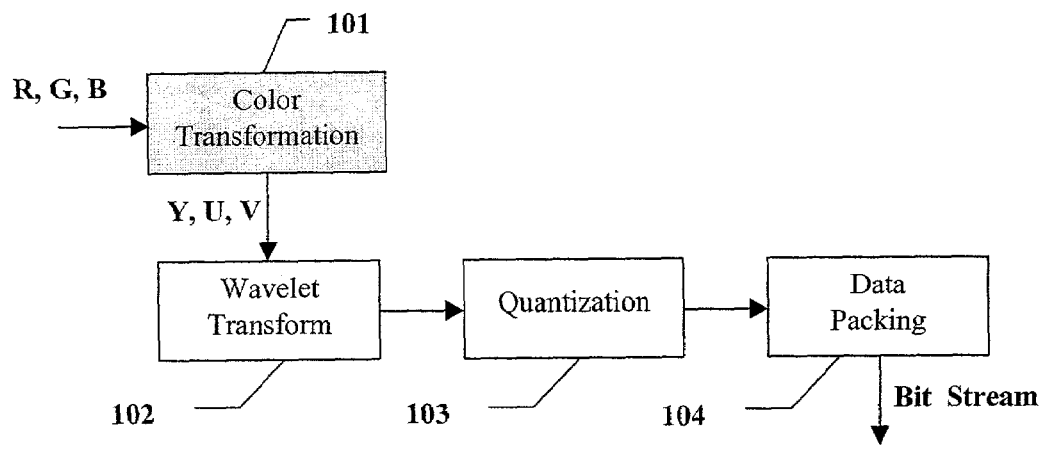
FIG. 1 is the flow chart of the wavelet transform image compression process of the present invention.

With reference to the figures, like reference characters will be used to indicate like elements throughout the several embodiments and views thereof.

Color images consist of three-color components, a red component R, a green component G, and a blue component B. To process color images efficiently these components can be transformed into luminance (brightness) Y, and chrominance (hue) U and V, components by using the following color transformation equation [1].

$$\begin{bmatrix} Y \\ U \\ V \end{bmatrix} = \begin{bmatrix} 0.299 & 0.587 & 0.114 \\ -0.169 & -0.331 & 0.500 \\ 0.500 & -0.419 & -0.081 \end{bmatrix} \begin{bmatrix} R \\ G \\ B \end{bmatrix} \quad (1)$$

Since the human visual system is more sensitive to the luminance component than the chrominance components, luminance is more important to human visual senses than chrominance. This transformation is typical in color image compression to keep more luminance than chrominance after data compression. Therefore, the compression algorithm can reduce the resolution of the chrominance components by decimation of a factor of two without loss of image quality. This results in the image being processed with full resolution luminance, and quarter sized chrominance, or 4:2:0 format.

As illustrated in FIG. 1, there are three basic operations to the invention of the image compression methodology: wavelet transform 102, quantization 103, and data packing 104. Color transformation 101 converts 24-bit color RGB to YUT in 4:2:0 format. This image compression methodology uses a multiple level wavelet transform 102 with symmetric biorthogonal seven and nine tap filters. The image is mirrored at the edges before transformation to provide better image reconstruction.

Forward Discrete Wavelet Transform

Figure 2:
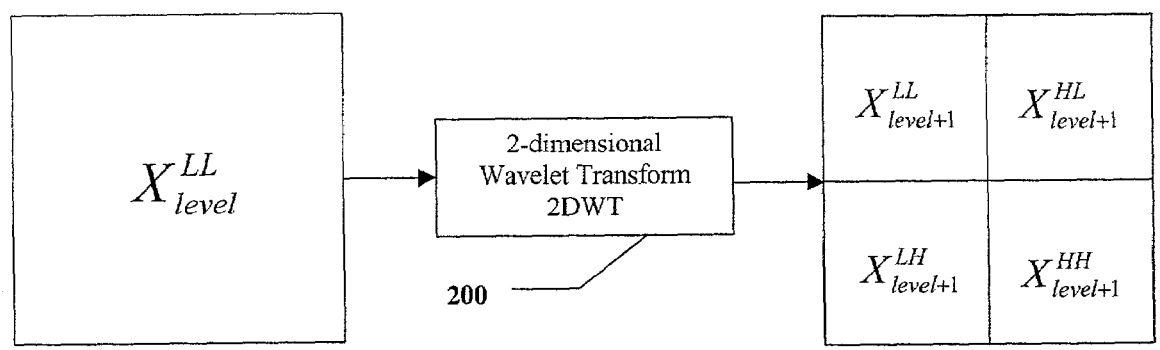
FIG. 2 illustrates the sub-band decomposition performed by the wavelet transform block 102 shown in the FIG. 1.

The 2-dimensional Wavelet Transform (2DWT) procedure performs a decomposition of a two-dimensional array of samples $X_{level}^{LL}$ into four groups of sub-band coefficients $X_{level+1}^{LL}$, $X_{level+1}^{HL}$, $X_{level+1}^{LH}$, and $X_{level+1}^{HH}$. The four sub-bands are filtered and down-sampled version of the original of samples, where level represents the level of the sub-band decomposition. LL, HL, LH, and HH are the transformation orientations. For instance, $X_{level+1}^{LH}$ represents the transform coefficients obtained from high-pass filtering vertically and low-pass filtering horizontally. FIG. 2 illustrates the sub-band decomposition performed by the 2DWT 200 procedure. Multiple levels of 2DWT can be performed by applying single 2DWT recursively. The 2DWT procedure first applies the 1-dimensional WT (1DWT) horizontally to all columns of $X_{level}^{LL}$, and then applies 1DWT vertically to all rows of $X_{level}^{LL}$. The 1DWT is the lifting-based WT implementation of filtering by the Daubechies 9/7 tap [1]. The more the decomposition/lifting levels, the closer the coding efficiently comes to some optimum point until it levels off because other adverse factors become significant. Although JPEG-2000 allows the number of wavelet decomposition levels between 0 to 32, as many lifting steps as desired can be performed to build highly sophisticated wavelet transforms. However, as the lifting level increases, the resulting subbands become smaller such that their filtering boundary effects reduce the coding efficiency. In addition, more packets are required thereby increasing packetization overhead. The increased rounding error (The filter coefficients used in the transform filters are usually floating point numbers which have to be scaled.) also become more pronounced.

Figure 3:
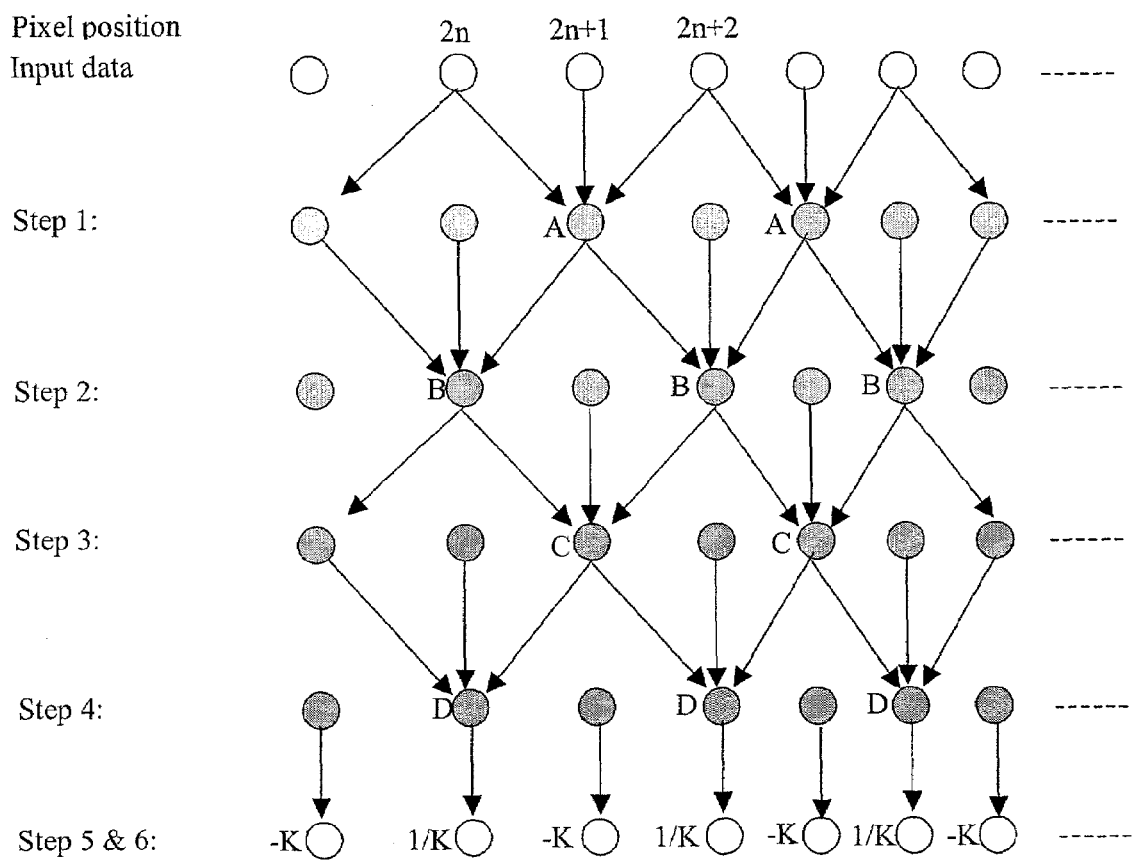
FIG. 3 depicts the functional structure of the forward-lifting discrete wavelet transform of the present invention.

Accordingly, the present invention applies the following four lifting steps and the two scaling steps of 1DWT performed on the extended signal X as described in Equation (2), where n is the one-dimensional pixel index, A=−1.586134342, B=−0.052980118, C=0.882911075, D=0.443506852, and K=1.230174105. The functional structure is displayed in FIG. 3.

$$\begin{cases} \text{Step1} & X_{2n+1} = X_{2n+1} + A(X_{2n} + X_{2n+2}) \\ \text{Step2} & X_{2n} = X_{2n} + B(X_{2n-1} + X_{2n+1}) \\ \text{Step3} & X_{2n+1} = X_{2n+1} + C(X_{2n} + X_{2n+2}) \\ \text{Step4} & X_{2n} = X_{2n} + D(X_{2n-1} + X_{2n+1}) \\ \text{Step5} & X_{2n+1} = -KX_{2n+1} \\ \text{Step6} & X_{2n} = \frac{1}{K}X_{2n} \end{cases} \quad (2)$$

In order to perform 1DWT in real time, the high precision floating-point operation is replaced by the table lookup manipulation. FIG. 4A–F illustrate the table lookup operations from step 1 to step 6 respectively. The sizes of the lookup tables vary due to the various dynamic ranges in the six steps. With these lookup tables, all the actual multiplication computations in Equation (2) are eliminated so as to save processing time.

Figure 4A:
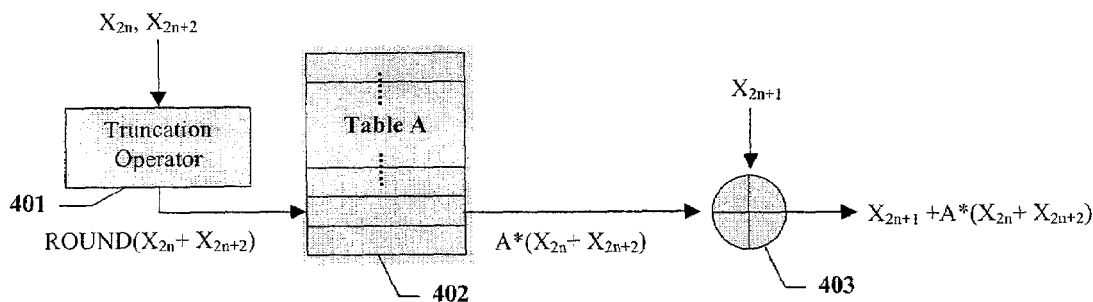
FIGS. 4A–F illustrate the table lookup operations from step 1 to step 6 depicted in FIG. 3 respectively.

Truncation operator 401 in FIG. 4A for step 1 is used to sum the floating-point numbers $X_{2n}$ and $X_{2n+2}$, and then convert and truncate to integer values between −384 and 639. The outcome of the truncation operator 401 plus 384 produces the address of the lookup table. The size of the lookup table 402 is 1024×4 bytes, in which every element represents a 4-byte floating-point number. The outcome of lookup table 402 is a 4-byte floating number, representing $A*(X_{2n}+X_{2n+2})$. The add operator 403 is used to sum the floating-point number $X_{2n+1}$ and the outcome of the lookup table 402.

Figure 4B:
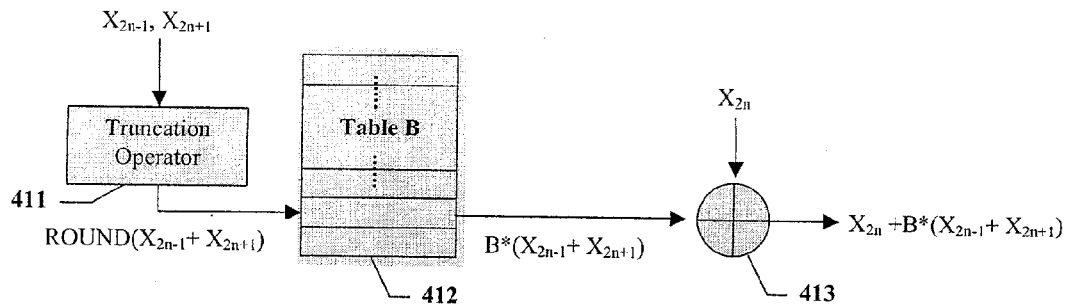

Truncation operator 411 in FIG. 4B for step 2 is to sum the floating-point numbers $X_{2n-1}$ and $X_{2n+1}$, and then convert and truncate to integer values between −1023 and 1024. The outcome of the truncation operator 411 plus 1023 produces the address of the lookup table. The size of the lookup table 412 is 2048×4 bytes, in which every element represents a 4-byte floating-point number. The outcome of lookup table 412 is a 4-byte floating number, representing $B*(X_{2n-1}+X_{2n+1})$. The add operator 413 is used to sum the floating-point number $X_{2n}$ and the outcome of the lookup table 412.

Figure 4C:
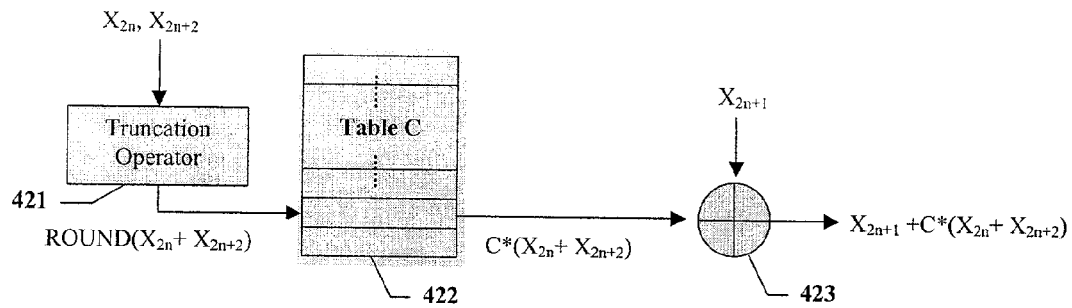

Truncation operator 421 in FIG. 4C for step 3 is used to sum the floating-point numbers $X_{2n}$ and $X_{2n+2}$, and then convert and truncate to integer values between −384 and 639. The outcome of the truncation operator 421 plus 384 produces the address of the lookup table. The size of the lookup table 422 is 1024×4 bytes, in which every element represents a 4-byte floating-point number. The outcome of lookup table 422 is a 4-byte floating number, representing $C*(X_{2n}+X_{2n+2})$. The add operator 423 is used to sum the floating-point number $X_{2n+1}$ and the outcome of the lookup table 422.

Figure 4D:
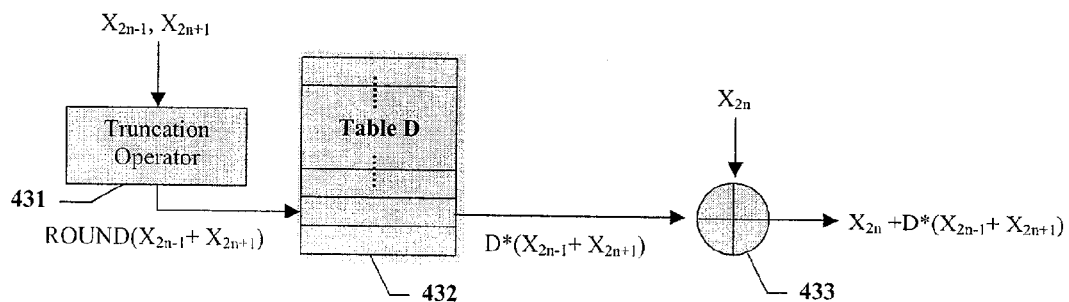

Truncation operator 431 in FIG. 4D for step 4 is used to sum the floating-point numbers $X_{2n-1}$ and $X_{2n+1}$, and then convert and truncate to integer values between −384 and 639. The outcome of the truncation operator 431 plus 384 produces the address of the lookup table. The size of the lookup table 432 is 1024×4 bytes, in which every element represents a 4-byte floating-point number. The outcome of lookup table 432 is a 4-byte floating number, representing $D*(X_{2n-1}+X_{2n+1})$. The add operator 433 is used to sum the floating-point number $X_{2n}$ and the outcome of the lookup table 432.

Figure 4E:
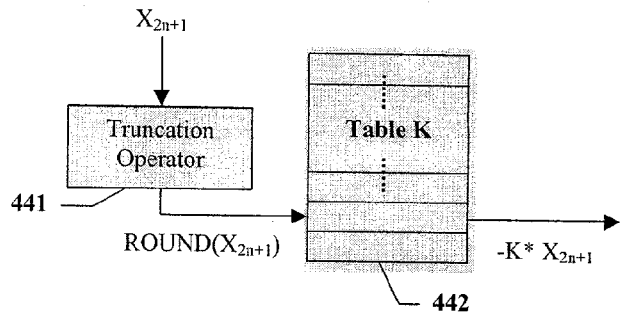

Truncation operator 441 in FIG. 4E for step 5 is used to truncate the floating-point $X_{2n+1}$ to integer values between −256 and 255. The outcome of the truncation operator 441 plus 256 produces the address of the lookup table. The size of the lookup table 442 is 512×4 bytes, in which every element represents a 4-byte floating-point number. The outcome of lookup table 442 is a 4-byte floating number, representing $-K*X_{2n+1}$.

Figure 4F:
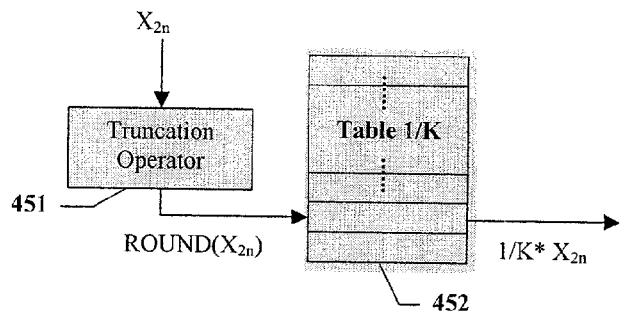

Truncation operator 451 in FIG. 4F for step 6 is used to truncate the floating-point $X_{2n}$ to integer values between −384 and 639. The outcome of the truncation operator 441 plus 384 produces the address of the lookup table. The size of the lookup table 452 is 1024×4 bytes, in which every element represents a 4-byte floating-point number. The outcome of lookup table 452 is a 4-byte floating number, representing $1/K*X_{2n}$.

Inverse Discrete Wavelet Transform

Figure 5:
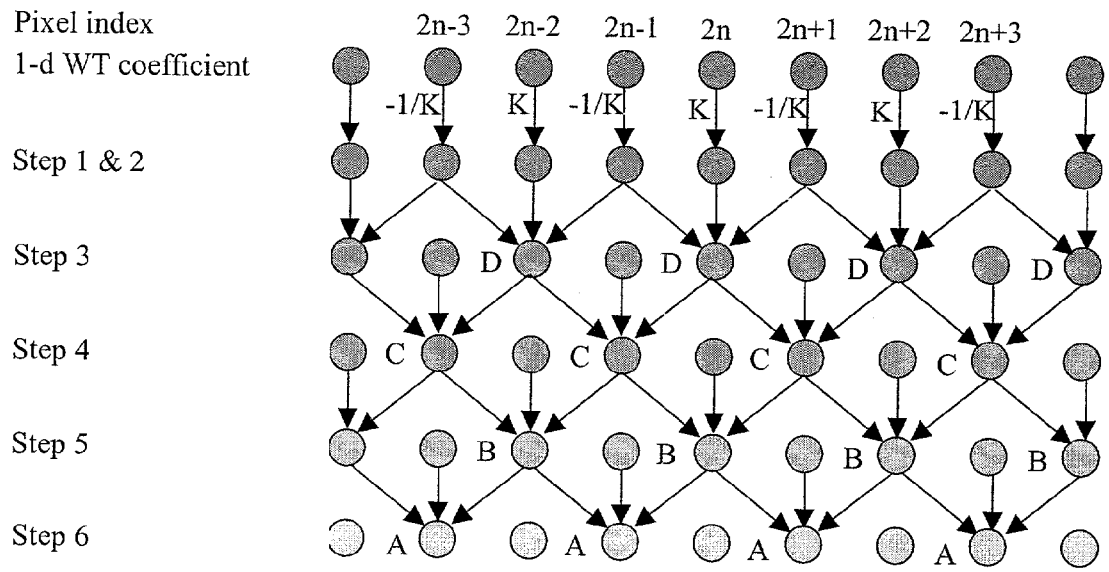
FIG. 5 depicts the functional structure of the inverse discrete wavelet transform of the present invention.

Inverting a lifting transform is the same as changing all the signs of the lifting scheme, and then running them backwards, i.e. start at the output. Equation (3) describes the 4 lifting steps and the 2 scaling steps of the Inverse 1DWT performed on the extended signal X, where n is the one-dimensional pixel index, A=−1.586134342, B=−0.052980118, C=0.882911075, D=0.443506852, and K=1.230174105. The functional structure is displayed in FIG. 5.

$$\begin{cases} Step1 & X_{2n} = KX_{2n} \\ Step2 & X_{2n+1} = \frac{-1}{K}X_{2n+1} \\ Step3 & X_{2n} = X_{2n} - D(X_{2n-1} + X_{2n+1}) \\ Step4 & X_{2n+1} = X_{2n+1} - C(X_{2n} + X_{2n+2}) \\ Step5 & X_{2n} = X_{2n} - B(X_{2n-1} + X_{2n+1}) \\ Step6 & X_{2n+1} = X_{2n+1} - A(X_{2n} + X_{2n+2}) \end{cases} \quad (3)$$

The functional blocks in FIG. 4 can be re-applied backward to implement Inverse Discrete Transform described in equation (3).

Quantization and De-quantization

Figure 6:
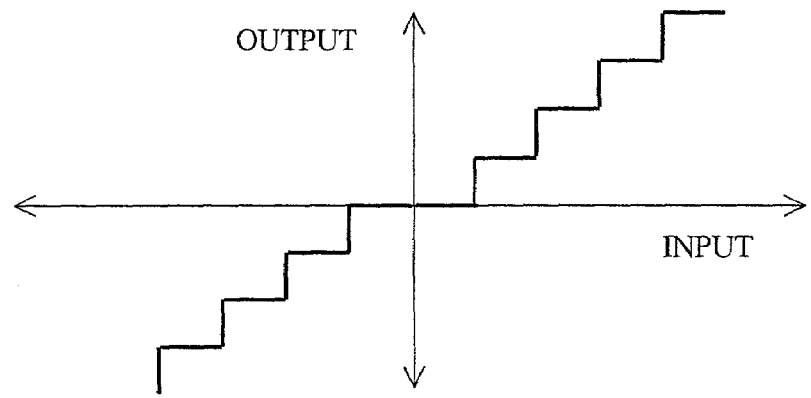
FIG. 6 illustrates the input/output relationship of quantizer according to the Equation (4).

Quantization is the process of converting a continuous signal into a discrete, digital representation of that signal. Choosing how to map the continuous signal to a discrete one depends on the application. For low distortion and high quality reconstruction, the quantizer must be constructed in such a way to take advantage of the signal's characteristics. Quantizing wavelet coefficients for image compression requires a compromise between low signal distortion, and the ability to produce quantized coefficients that are easily compressed. It is the probability distribution of the wavelet coefficients that enables such high compression of images. Any quantization technique should try to preserve this property of the data. This compression algorithm uses uniform scalar quantization with a dead zone around zero. Scalar quantization means that each wavelet coefficient is quantized separately, one at a time. This technique preserves the structure of the wavelet data, allowing efficient compression. The dead zone at zero helps to increase compression without introducing large amounts of distortion. The compression level is adjusted by a user-controlled parameter that effects the quantization. The user can increase compression by introducing a higher quantization error in exchange for degraded image quality. The uniform quantization is performed by first dividing the wavelet coefficients by the user-defined parameter, CR. The new values are truncated to produce a rounding towards zero effect, regardless if the value is positive or negative. Input/Output relationship of quantizer is illustrated in FIG. 6 and described in equation (4), where X is the DWT coefficients, $\lfloor X \rfloor$ is the floor function to indicate the largest integer not exceeding X CR is the user-defined quantizer, |X| is the absolute function of X, Q is the quantized integer coefficients, sign(X) returns the sign value of X, and $\hat{X}$ is de-quantized coefficients. To de-quantize the wavelet coefficients, the procedure is reversed. First, 0.5 is added to the quantized value. This shifting of the quantized value to the middle of the bin is required because of the rounding towards zero. This value is then multiplied by the CR parameter. If the quantized value is zero, then the de-quantized value will also be zero.

$$\begin{cases} \text{Quantization:} & Q = \lfloor \frac{|X|}{CR} \rfloor * \text{sign}(X) \\ \text{De-quantization:} & \hat{X} = (|Q| + 0.5) * CR * \text{sign}(Q) \end{cases} \quad (4)$$

In order to raise the compression ratio and satisfy human visual reception, this still image compression algorithm applies various quantizations into different DWT subbands. These multiple-level quantizations are also applied to luminance, Y, and chrominance, U and V, components. Four and three levels of DWT are applied in luminance, Y and chrominance, U and V, components respectively in this still image compression algorithm.

In the quantization of luminance Y component, $X_{level}^{HL}$, and $X_{level}^{LH}$ are truncated to (−63, 63) first, and $X_{level}^{HH}$ is discarded when level=1. Similarly, $X_{level}^{HL}$, $X_{level}^{LH}$, and $X_{level}^{HH}$ are truncated to (−127,127), (−127,127), and (−255, 255) for level=2, 3, and 4 respectively. Then the truncated values are quantized using various quantizers, $q_{level}$, the scale quantizer at the specific levels. $q_{level}$ are $$\lceil \frac{CR}{1} \rceil, \lceil \frac{CR}{2} \rceil, \lceil \frac{CR}{3} \rceil,$$

, and $$\lceil \frac{CR}{4} \rceil$$

for level=1, 2, 3, and 4, where ⌈X⌉ is the ceiling function to indicate the smallest integer not exceeding X.

In the quantization of chrominance U and V components, $X_{level}^{HL}$, and $X_{level}^{LH}$ and $X_{level}^{HH}$ are discarded when level=1. Next, $X_{level}^{HL}$, $X_{level}^{LH}$, and $X_{level}^{HH}$ are truncated to (−31,31) and (−63,63) for level=2 and 3 respectively. Then the truncated values are quantized using various quantizers, $q_{level}$, the scale quantizer at the specific levels. $q_{level}$ are $$\left\lceil \frac{CR}{6} \right\rceil$$

and $$\left\lceil \frac{CR}{7} \right\rceil$$

for level=2 and 3.

The de-quantization procedure is the inverse of the quantization process.

Implementation of Discrete Wavelet Transform

The 1D Lifting Forward WT in equation (2) can be combined sequentially and formed in a single equation described in equation (5), in which two processings of truncation, i.e., lookup tables and quantization, are performed to simplify the computation yet reserved desired accuracy to maintain the image quality.

Where $C_i$, i is from 1 to 9 in equation (7), are the scale coefficients derived previously.

$$\begin{cases} C_1 = -K(1+CB) = -1.172630579 \\ C_2 = -K(A+C+3*ABC) = 0.5912717669 \\ C_3 = -KBC = 0.0575435255 \\ C_4 = -KABC = -0.091271762 \\ C_5 = \frac{ABCD}{K} = 0.0261456377 \\ C_6 = \frac{1+2AB+2CD+2AD+6ABCD}{K} = 0.6107632047 \\ C_7 = \frac{B+D+3*BCD}{K} = 0.2598759232 \\ C_8 = \frac{AB+AD+CD+4*ABCD}{K} = -0.074919292 \\ C_9 = \frac{BCD}{K} = -0.016483873 \end{cases} \quad (7)$$

Figure 7:
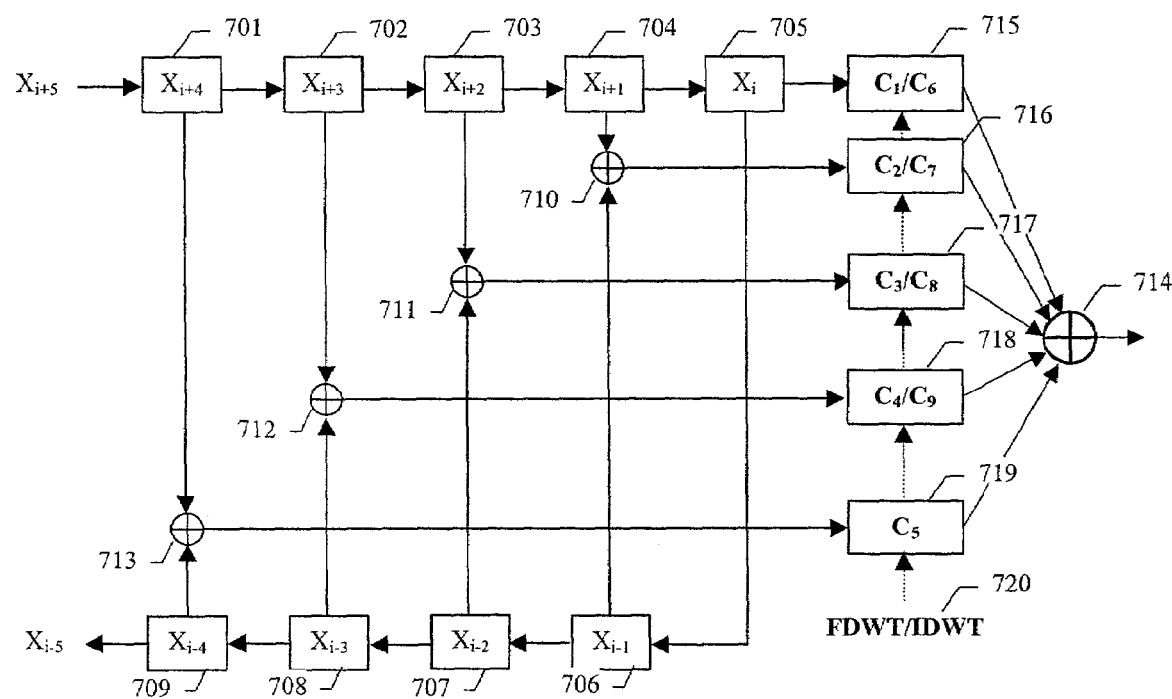
FIG. 7 illustrates the hardware implementation of the forward and inverse WT described in Equations (5)–(7).

FIG. 7 illustrates the hardware implementation of the forward and inverse WT described in equations (5)–(7). In FIG. 7, nine functional blocks labeled from 701 to 709 respectively form a 9-element shift register. The function of the shift register is to shift the data in single increments clock moving to the specific direction shown by an arrow in FIG. 7. There are five adders in this implementation. Adders 710 to 713 perform two-input addition, and adder 714 is designed for 5-input addition. Multipliers 715 to 718 contains 2 various multiplicands. A multiplicand is selected automatically by the system based on FDWT/IDWT operation and the position (even or odd) of the processed pixel.

$$\begin{cases} \text{if } i = \text{odd number} \\ X_i = C_1 X_i + C_2(X_{i-1}+X_{i+1}) + C_3(X_{i-2}+X_{i+2}) + C_4(X_{i-3}+X_{i+3}) \\ \text{if } i = \text{even number} \\ X_i = C_6 X_i + C_7(X_{i-1}+X_{i+1}) + C_8(X_{i-2}+X_{i+2}) + C_9(X_{i-3}+X_{i+3}) + +C_5(X_{i-4}+X_{i+4}) \end{cases} \quad (5)$$

Similarly, the 1D Lifting Inverse WT in equation (3) can be also derived and formed as a single equation as in equation (6).

Multiplier 719 performs a single multiplication. The FDWT/IDWT 720 is the control signal used to select the operation of FDWT or IDWT.

$$\begin{cases} \text{if } i = \text{odd number} \\ X_i = -C_6 X_i + C_2(X_{i-1}+X_{i+1}) - C_8(X_{i-2}+X_{i+2}) + C_4(X_{i-3}+X_{i+3}) - C_5(X_{i-4}+X_{i+4}) \\ \text{if } i = \text{even number} \\ X_i = -C_1 X_i + C_7(X_{i-1}+X_{i+1}) - C_3(X_{i-2}+X_{i+2}) + C_9(X_{i-3}+X_{i+3}) \end{cases} \quad (6)$$

Adaptive Run Length and Huffman Coding

Figure 8:
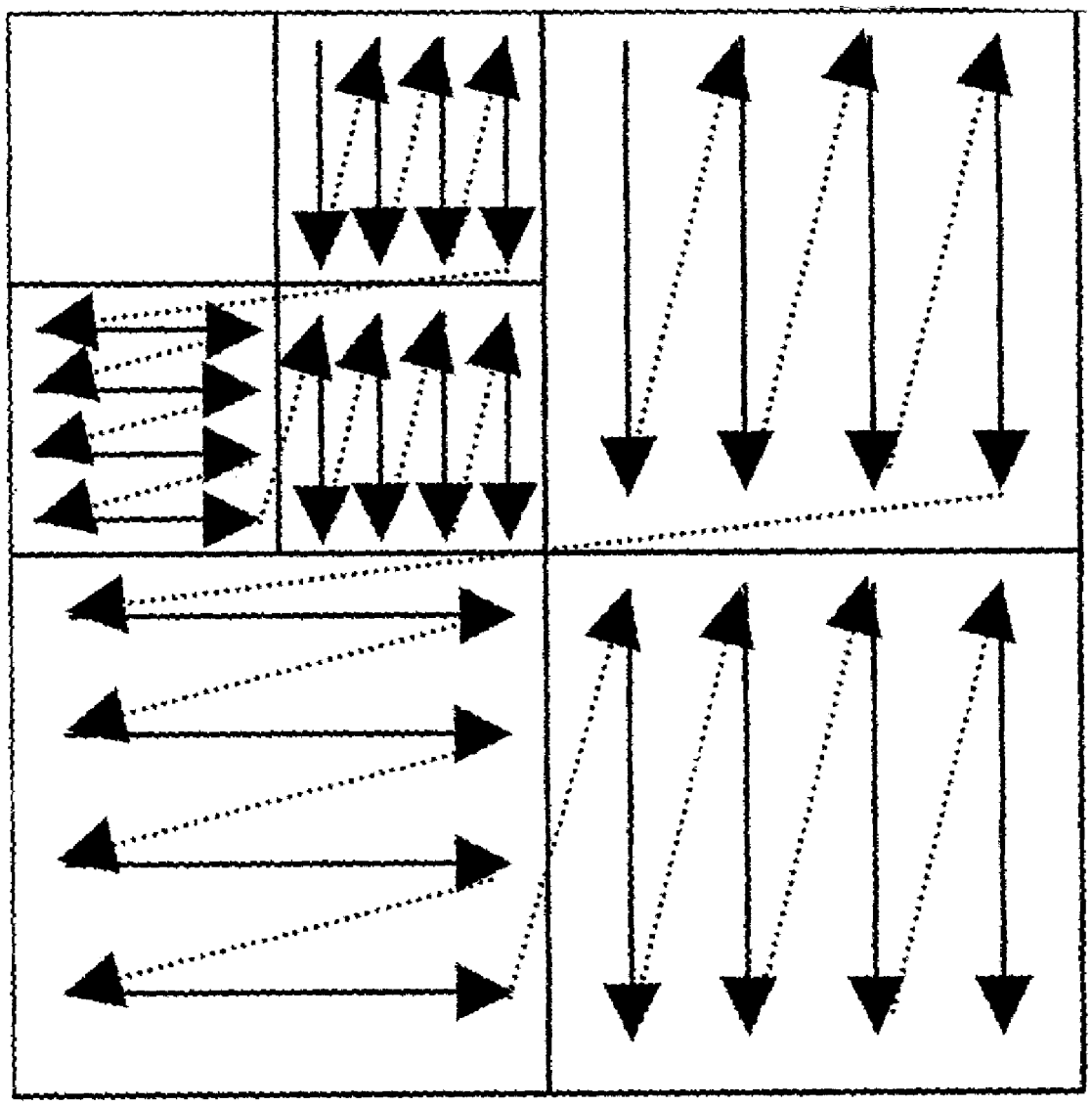
FIG. 8 shows the particular sequence used in scanning the coefficients according to present invention.

The adaptive run length coding function combines Huffman codes with run-length coding. It is applied to the quantized wavelet coefficients to all levels. Once forward WT and quantization operations are complete, the quantized WT coefficients are formed. The 1-dimensional signal conversion is performed for the data packing process. The particular sequence used in scanning the coefficients is shown in FIG. 8. The scanning order is dependent on the subband coefficients. The solid line is the scanning sequence within a subband, and the dot line is the scanning sequence between subbands. The objective for such a scanning sequence is to form runs having the maximum number of zero-quantized coefficients possible. This improves the efficiency of the run-length encoding (RLE) which is used to encode the number of consecutive zero values in the block.

Once the data is scanned, run-length coding is performed on the data. The output of this run-length coding is a data stream consisting of non-zero coefficients, and zero plus run words. A ran is defined to be the number of zeros following the first zero of a sequence. A sequence of just one zero would be coded as a zero followed by a zero. A sequence of ten zeros, would result in a zero followed by a nine. For instance, the following input will produce the following output.

Input: 1 0 0 0 0 0 0 0 1 3-1 2 0 0 0 0 0 2 0 1 1 1 0 0 0 0 0 0 0 0 0 0 1 -1
Out-put: 1 0 7 1 3-1 2 0 4 2 0 0 1 1 1 0 9 1-1

After the run-length coding, the data is compressed using the Huffman tables shown in FIG. 9. The Huffman table has a plurality of predetermined binary codes associated with each of a plurality of zero run-lengths, the plurality of zero run-lengths including length$\leq$8, 9$\leq$length$\leq$10, 11$\leq$length$\leq$14, 15$\leq$length$\leq$22, 23$\leq$length$\leq$38, 39$\leq$length$\leq$70, 71$\leq$length$\leq$134, 135$\leq$length$\leq$262, 263$\leq$length$\leq$518, 519$\leq$length$\leq$1030, 1031$\leq$length$\leq$2054, 2055$\leq$length$\leq$4102, 4103$\leq$length$\leq$8198, 8199$\leq$length$\leq$16390, 16391$\leq$length$\leq$32774. If the run is zero and the length is less than or equal to 8, the length of 0's is coded. For instance, if the input data sequence is 0 0 0 0 0, in which the run is zero and each zero takes 5 bits such that the sequence takes 25 bits. After the compressed according to the first row of the Huffman Table in FIG. 9, the data sequence is compressed to 00000, a 5 bit stream. Similarly, 24 consecutive zeros (24*5=120 bits) can be compressed into the code word 1111101110 according to the fifth row of the Huffman Table followed by 0001, which 4 bits represent the number 24, such that the sequence takes only 14 bits. A similar principle can be applied to code the non-zero data, i.e., a plurality of positive and negative integer values ±1–259 as listed in the Huffman Table.

This adaptive run length Huffman coding provides a highly efficient and single pass data packing mechanism.

Differential Video Compression Mechanism

Figure 10:
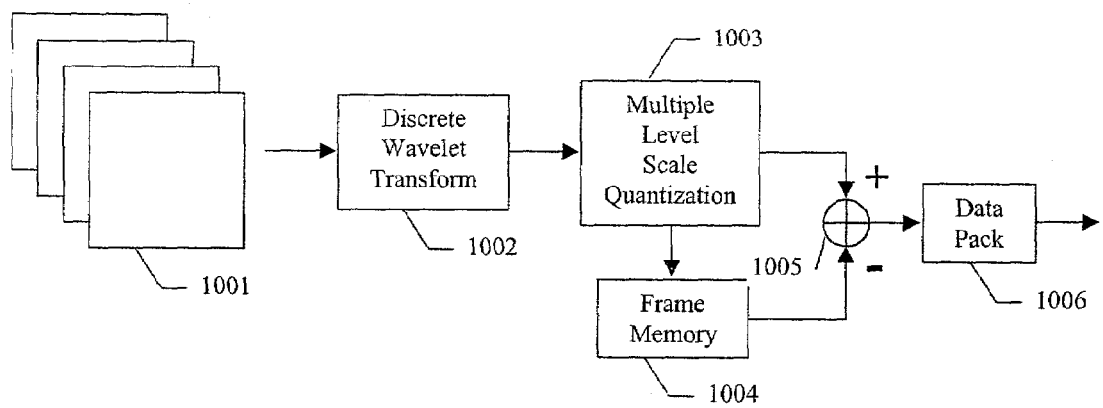
FIG. 10 shows the functional block diagrams of a differential video encoder according to the present invention.
Figure 11:
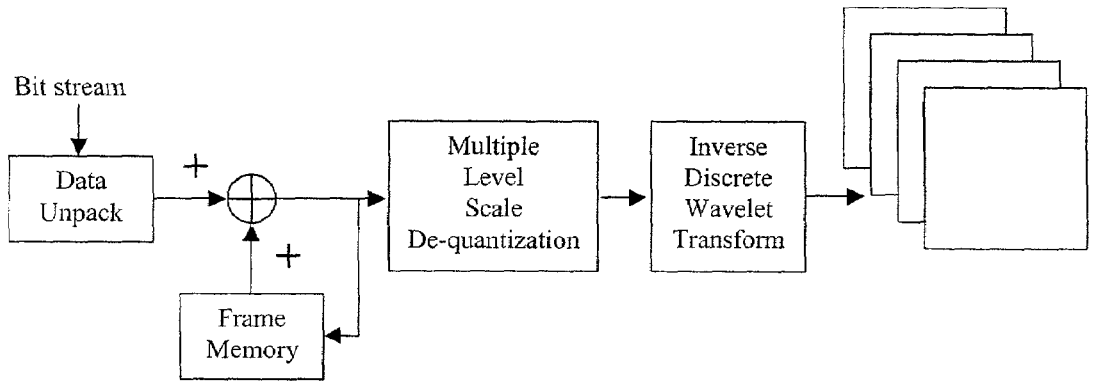
FIG. 11 shows the functional block diagrams of a motion wavelet video decoder to reverse the processing according to FIG. 10.
Figure 12:
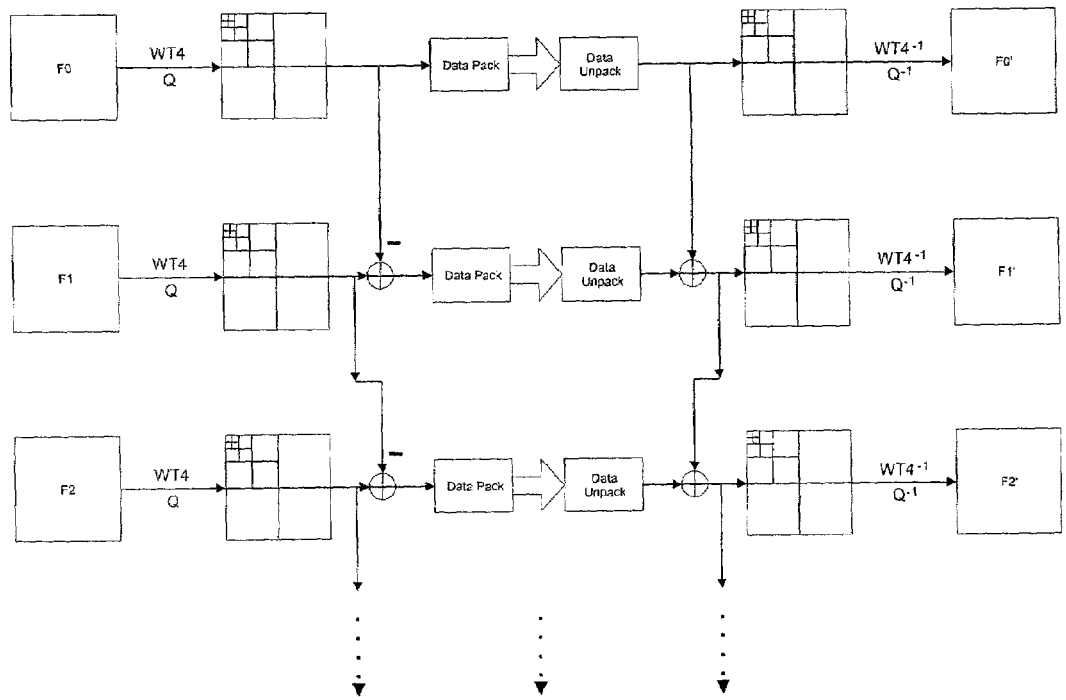
FIG. 12 illustrates the hierarchical structure of differential video coding/decoding according to the present invention.

The motion wavelet video codec is the invention for high-speed, high-efficiency, low-bit rate video compression. The video encoder consists of a wavelet transform, quantization, and data packing technique illustrated previously. Under the available bandwidth, the video encoder processes each frame of the video sequence as one of two types, a reference frame or a difference frame. The reference frames, called intra frames as well, are coded by first applying discrete wavelet transform on the image. Then, the coefficients are quantized and compressed. When coding a difference frame (inter frame), the image is first transformed and then quantized. Once the scale quantization is complete, the difference of quantized wavelet coefficients between consecutive frames is calculated and then packed to the bit stream. To maintain the video quality, the intra frame is processed within seconds. FIG. 10 shows the functional block diagrams of a differential video encoder. In FIG. 10, the consecutive video frames 1001 are captured and digitized first, then the Discrete Wavelet Transform is applied 1002. Once the transformation is complete, the wavelet coefficients are quantized using multiple-level scale quantization 1003. The output of quantization 1003 is sent to frame memory 1004 and adder 1005. The function of frame memory 1004 is to store the previous quantized wavelet coefficients, and the adder is to perform the difference of two consecutive quantized wavelet coefficients, which are then packed using data pack 1006. The output of data pack 1006 is the bit stream to be transmitted. The motion wavelet video decoder processed backward is shown in FIG. 11. The hierarchical structure of differential video codec is illustrated in FIG. 12.

Figure 13:
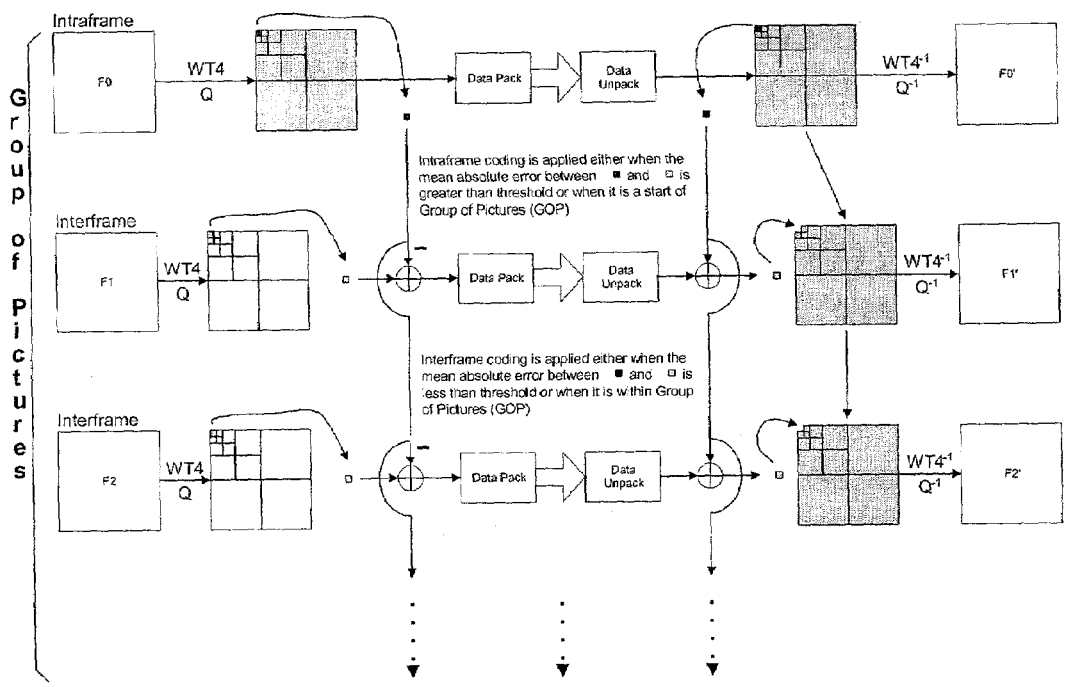
FIG. 13 demonstrates the architecture of the adaptive video estimation mechanism between two consecutive frames according to the present invention.

In order to process video more efficiently, the mean absolute error of the lowest band wavelet coefficient between two consecutive frames with a group of pictures is applied to estimate compression status. If the mean absolute error of the lowest band wavelet coefficient is greater than the specific threshold, the intra frame compression is processed. Otherwise, the inter frame compression scheme is processed, when only lower-frequency subbands are transmitted. The levels of WT subbands transmitted are based on the mean absolute error of the consecutive frames. This adaptive estimation mechanism between two consecutive frames can not only precisely indicate the frame with new scene, but also increase the compression ratio and raise the image quality. The architecture of the adaptive video estimation mechanism between two consecutive frames is demonstrated in FIG. 13.

N-to-N Videoconferencing

Figure 14:
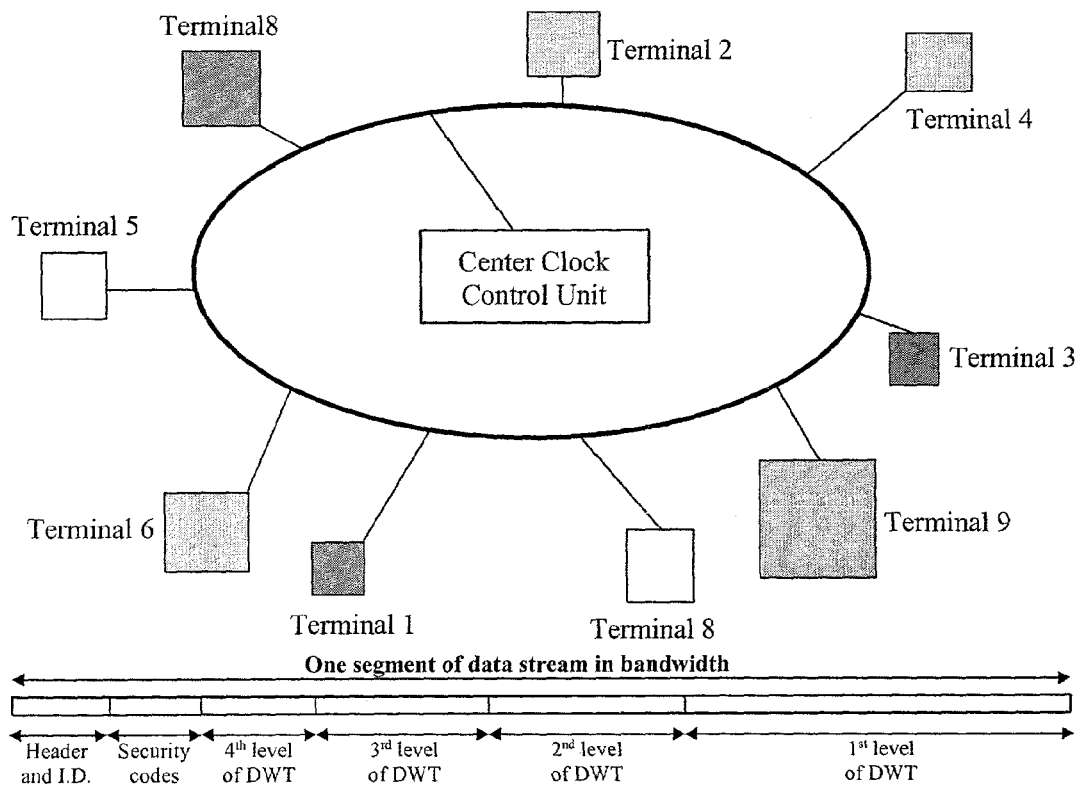
FIG. 14 is the block diagram of the symmetric N-to-N videoconferencing system according to the present invention.
Figure 15:
FIG. 15 shows an example of 4 users in videoconferencing.

In videoconferencing, quality is often judged by human vision perception, rather than by measurement. Quality depends on a variety of factors, including picture resolution, frame refresh rate and artifacts. Low latency between sending and receiving the signals is also significant. Due to the requirement of high fidelity, high compression, multiple resolution, multiple displays in teleconferencing, the technology of discrete biorthogonal subband wavelet transform plays an important role. In order to achieve a symmetric N-to-N videoconferencing, every terminal needs to encode and decode the video images and the codec must be built in every terminal (machine). In addition, multi-resolution of DWT provides the need of sharing video information concurrently. Regarding to the construction of sharing video information, the mechanism of bandwidth in the local area visual communication network is remarkably significant in data transmission. A center clock is required to synchronize and distribute the bandwidth of the local area visual communication network. The video wavelet codec in each terminal is synchronized by a specific block via receiving the header from the center clock control unit. The header contains the information such as the status of video codec in each terminal, levels of DWT, the priority sequence of terminals, and the identification code for each terminal. The block diagram of the symmetric N-to-N videoconferencing system is shown in FIG. 14. In FIG. 14, the security code is also included in the transmission data stream to secure the conversation during videoconferencing. An example of 4 users in videoconferencing are shown in FIG. 15.

Not only can the lifting transform be used in a classical separable multi-dimensional setting, but it can be made truly multi-dimensional. In present invention, the lifting transform is extended to a true two-dimensional transform. By implementing the teaching of U.S. Pat. No. 6,246,798 B1, the present invention can expand to any dimension and beyond the power of 2. The principles behind lifting do not change at all in the multi-dimensional setting.

The principles, preferred embodiments and modes of operation of the present invention have been described in the foregoing specification. However, the invention that is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for compressing image data comprising the steps of:
   color-transforming the image data to provide color-transformed data;
   wavelet-transforming the color-transformed data to provide a series of wavelet coefficients in different levels of wavelet transformation subbands;
   quantizing the wavelet coefficients which fall above a predetermined threshold value to provide a series of quantized wavelet coefficients;
   applying an entropy coding to the quantized wavelet coefficients to provide coded wavelet coefficients; and
   compressing the coded wavelet coefficients to provide compressed image data, wherein the wavelet transformation step includes determining in sequence $$\begin{cases} X_{2n+1} = X_{2n+1} + A(X_{2n} + X_{2n+2}) \\ X_{2n} = X_{2n} + B(X_{2n-1} + X_{2n+1}) \\ X_{2n+1} = X_{2n+1} + C(X_{2n} + X_{2n+2}) \\ X_{2n} = X_{2n} + D(X_{2n-1} + X_{2n+1}) \\ X_{2n+1} = -KX_{2n+1} \\ X_{2n} = \frac{1}{K}X_{2n} \end{cases}$$

for lifting and scaling the color-transformed data thereby providing the series of wavelet coefficients, where X is one of the color-transformed data, n is a one-dimensional pixel index, A=−1.586134342, B=−0.052980118, C=0.882911075, D=0.443506852, and K=1.230174105.

2. The method for compressing image data according to claim 1, wherein the wavelet transformation steps include a plurality of lookup tables.

3. The method for compressing image data according to claim 2, wherein the X is a floating point number to be converted and truncated to an integer according to the lookup tables.

4. A method for compressing image data comprising the steps of:
   color-transforming the image data to provide color-transformed data;
   wavelet-transforming the color-transformed data to provide a series of wavelet coefficients in different levels of wavelet transformation subbands;
   quantizing the wavelet coefficients which fall above a predetermined threshold value to provide a series of quantized wavelet coefficients;
   applying an entropy coding to the quantized wavelet coefficients to provide coded wavelet coefficients; and
   compressing the coded wavelet coefficients to provide compressed image data, wherein the quantizing step includes quantizing the wavelet coefficients in different levels of wavelet transformation subbands in accordance with:

$$\left\{ Q = \left\lfloor \frac{|X|}{CR} \right\rfloor * \text{sign}(X) \right\}$$

where X is one of the wavelet coefficients which falls above a predetermined threshold value, and CR is a user-defined quantizer.

5. A method for compressing image data comprising the steps of:
   color-transforming the image data to provide color-transformed data;
   wavelet-transforming the color-transformed data to provide a series of wavelet coefficients in different levels of wavelet transformation subbands;
   quantizing the wavelet coefficients which fall above a predetermined threshold value to provide a series of quantized wavelet coefficients;
   applying an entropy coding to the quantized wavelet coefficients to provide coded wavelet coefficients; and
   compressing the coded wavelet coefficients to provide compressed image data, wherein the entropy coding step includes applying a Huffman run-length combined coding by performing a run-length coding on the data and then further compressing the run-length coded data in accordance with a Huffman table having a plurality of predetermined binary codes being associated with each of a plurality of zero run-lengths said plurality of zero run-lengths including the ranges of less than or equal to 8, 9 to 10, 11 to 14, 15 to 22, 23 to 38, 39 to 70, 71 to 134, 135 to 262, 263 to 518, 519 to 1030, 1031 to 2054, 2055 to 4102, 4103 to 8198, 8199 to 16390, and 16391 to 32774.

6. The method for compressing image data according to claim 5, wherein the Huffman table further includes a plurality of predetermined binary codes being associated with each of a plurality of positive and negative integer values.

7. A method for compressing image data, comprising the steps of:
   color-transforming the image data to provide color-transformed data;
   wavelet-transforming the color-transformed data to provide a series of wavelet coefficients in different levels of wavelet transformation subbands;
   quantizing the wavelet coefficients which fall above a predetermined threshold value to provide a series of quantized wavelet coefficients;
   applying an entropy coding to the quantized wavelet coefficients to provide coded wavelet coefficients; and compressing the coded wavelet coefficients to provide compressed image data, wherein the wavelet transformation step includes determining $$\begin{cases} X_i = C_1 X_i + C_2(X_{i-1} + X_{i+1}) + C_3(X_{i-2} + X_{i+2}) + C_4(X_{i-3} + X_{i+3}) \\ \qquad \text{if } i = \text{odd number} \\ X_i = C_6 X_i + C_7(X_{i-1} + X_{i+1}) + C_8(X_{i-2} + X_{i+2}) + C_9(X_{i-3} + X_{i+3}) + + C_5(X_{i-4} + X_{i+4}) \\ \qquad \text{if } i = \text{even number} \end{cases}$$

for lifting and scaling the color-transformed data thereby providing the series of wavelet coefficients, where X is one of the color-transformed data, $C_i$, i is from 1 to 9, A=−1.586134342, B=−0.052980118, C=0.882911075, D=0.443506852, and K=1.230174105, wherein $$\begin{cases} C_1 = -K(1 + CB) = -1.172630579 \\ C_2 = -K(A + C + 3*ABC) = 0.5912717669 \\ C_3 = -KBC = 0.0575435255 \\ C_4 = -KABC = -0.091271762 \\ C_5 = \dfrac{ABCD}{K} = 0.0261456377 \\ C_6 = \dfrac{1 + 2AB + 2CD + 2AD + 6ABCD}{K} = 0.6107632047 \\ C_7 = \dfrac{B + D + 3*BCD}{K} = 0.2598759232 \\ C_8 = \dfrac{AB + AD + CD + 4*ABCD}{K} = -0.074919292 \\ C_9 = \dfrac{BCD}{K} = -0.016483873 \end{cases}$$

8. A method for compressing image data comprising the steps of:
  color-transforming the image data to provide color-transformed data;
  wavelet-transforming the color-transformed data to provide a series of wavelet coefficients in different levels of wavelet transformation subbands;
  quantizing the wavelet coefficients which fall above a predetermined threshold value to provide a series of quantized wavelet coefficients;
  applying an entropy coding to the quantized wavelet coefficients to provide coded wavelet coefficients; and
  compressing the coded wavelet coefficients to provide compressed image data, wherein in the color transformation step, the color-transformed data include a luminance component and two chrominance components, and the quantizing step includes applying different numbers of levels of wavelet transformation to the different components.

9. The method for compressing image data according to claim 8, wherein four levels of wavelet transformation are applied to the luminance component and three levels of wavelet transformation are applied to the two chrominance components.

10. A method for de-compressing compressed image data comprising the steps of:
  de-compressing the compressed image data to provide a series of coded wavelet coefficients;
  applying an entropy decoding to the coded wavelet coefficients to provide a series of de-coded wavelet coefficients;
  de-quantizing the de-coded wavelet coefficients to provide a series of de-quantized wavelet coefficients;
  inversely wavelet-transforming the de-quantized wavelet coefficients in different levels of wavelet transformation subbands to provide color-transformed data; and
  inversely color-transforming the color-transformed data to provide de-compressed image data,
  wherein the inverse entropy coding step includes applying an inverse Huffman run-length combined coding by further de-compressing the de-compressed data in accordance with a Huffman table and then performing a run-length coding on the data, the Huffman table having a plurality of predetermined binary codes being associated with each of a plurality of zero run-lengths, said plurality of zero run-lengths including the ranges of less than or equal to 8, 9 to 10, 11 to 14, 15 to 22, 23 to 38, 39 to 70, 71 to 134, 135 to 262, 263 to 518, 519 to 1030, 1031 to 2054, 2055 to 4102, 4103 to 8198, 8199 to 16390, and 16391 to 32774.

11. The method for de-compressing compressed image data according to claim 10, wherein the Huffman table further includes a plurality of predetermined binary codes being associated with each of a plurality of positive and negative integer values.

12. A method for de-compressing compressed image data, comprising the steps of:
  de-compressing the compressed image data to provide a series of coded wavelet coefficients;
  applying an entropy decoding to the coded wavelet coefficients to provide a series of de-coded wavelet coefficients;
  de-quantizing the de-coded wavelet coefficients to provide a series of de-quantized wavelet coefficients;
  inversely wavelet-transforming the de-quantized wavelet coefficients in different levels of wavelet transformation subbands to provide color-transformed data; and
  inversely color-transforming the color-transformed data to provide de-compressed image data,
  wherein the de-quantizing step includes de-quantizing the de-coded wavelet coefficients in different levels of wavelet transformation subbands in accordance with:

$\{\hat{X}=(|Q|+0.5)*CR* \text{sign}(Q)\}$ where Q is one of the de-coded wavelet coefficients, and CR is a user-defined quantizer.

13. A method for de-compressing compressed image data comprising the steps of:
  de-compressing the compressed image data to provide a series of coded wavelet coefficients;

applying an entropy decoding to the coded wavelet coefficients to provide a series of de-coded wavelet coefficients;
de-quantizing the de-coded wavelet coefficients to provide a series of de-quantized wavelet coefficients;
inversely wavelet-transforming the de-quantized wavelet coefficients in different levels of wavelet transformation subbands to provide color-transformed data; and
inversely color-transforming the color-transformed data to provide de-compressed image data,
wherein the inverse wavelet transformation step includes determining in sequence $$\begin{cases} X_{2n} = KX_{2n} \\ X_{2n+1} = \dfrac{-1}{K}X_{2n+1} \\ X_{2n} = X_{2n} - D(X_{2n-1} + X_{2n+1}) \\ X_{2n+1} = X_{2n+1} - C(X_{2n} + X_{2n+2}) \\ X_{2n} = X_{2n} - B(X_{2n-1} + X_{2n+1}) \\ X_{2n+1} = X_{2n+1} - A(X_{2n} + X_{2n+2}) \end{cases}$$

for de-scaling and de-lifting the de-quantized wavelet coefficients thereby providing the series of wavelet coefficients, where X is one of the de-quantized wavelet coefficients, n is an one-dimensional pixel index, A=−1.586134342, B=−0.052980118, C=0.882911075, D=0.443506852, and K=1.230174105.

14. The method for de-compressing compressed image data according to claim 13, wherein the inverse wavelet transformation step includes applying a plurality of lookup tables.

15. The method for de-compressing compressed image data according to claim 14, wherein the X is recovered according to the lookup tables.

16. A method for de-compressing compressed image data, comprising the steps of:
de-compressing the compressed image data to provide a series of coded wavelet coefficients;
applying an entropy decoding to the coded wavelet coefficients to provide a series of de-coded wavelet coefficients;
de-quantizing the de-coded wavelet coefficients to provide a series of de-quantized wavelet coefficients;
inversely wavelet-transforming the de-quantized wavelet coefficients in different levels of wavelet transformation subbands to provide color-transformed data; and
inversely color-transforming the color-transformed data to provide de-compressed image data,
wherein the inverse wavelet transformation step includes determining for de-scaling and de-lifting the de-quantized wavelet coefficients thereby providing the series of wavelet coefficients, where X is one of the de-quantized wavelet coefficients, $C_i$, i is from 1 to 9, A=−1.586134342, B=−0.052980118, C=0.882911075, D=0.443506852, and K=1.230174105, wherein $$\begin{cases} C_1 = -K(1+CB) = -1.172630579 \\ C_2 = -K(A+C+3*ABC) = 0.5912717669 \\ C_3 = -KBC = 0.0575435255 \\ C_4 = -KABC = -0.091271762 \\ C_5 = \dfrac{ABCD}{K} = 0.0261456377 \\ C_6 = \dfrac{1+2AB+2CD+2AD+6ABCD}{K} = 0.6107632047 \\ C_7 = \dfrac{B+D+3*BCD}{K} = 0.2598759232 \\ C_8 = \dfrac{AB+AD+CD+4*ABCD}{K} = -0.074919292 \\ C_9 = \dfrac{BCD}{K} = -0.016483873 \end{cases}$$

17. A method for de-compressing compressed image data, comprising the steps of:
de-compressing the compressed image data to provide a series of coded wavelet coefficients;
applying an entropy decoding to the coded wavelet coefficients to provide a series of de-coded wavelet coefficients;
de-quantizing the de-coded wavelet coefficients to provide a series of de-quantized wavelet coefficients;
inversely wavelet-transforming the de-quantized wavelet coefficients in different levels of wavelet transformation subbands to provide color-transformed data; and
inversely color-transforming the color-transformed data to provide de-compressed image data,
wherein the de-quantized wavelet coefficients include a luminance component and two chrominance components, and the inversely wavelet-transforming means applies to different components with different numbers of levels of inverse wavelet transformation.

18. The method for de-compressing compressed image data according to claim 17, wherein four levels of inverse wavelet transformation are applied to the luminance component and three levels of inverse wavelet transformation are applied to the two chrominance components.

19. A image data compression/de-compression system having at least one of a data compressor and a data de-compressor, said data compressor comprising:

$$\begin{cases} X_i = -C_6 X_i + C_2(X_{i-1} + X_{i+1}) - C_8(X_{i-2} + X_{i+2}) + C_4(X_{i-3} + X_{i+3}) - C_5(X_{i-4} + X_{i+4}) \\ \qquad\qquad \text{if } i = \text{odd number} \\ X_i = -C_1 X_i + C_7(X_{i-1} + X_{i+1}) - C_3(X_{i-2} + X_{i+2}) + C_9(X_{i-3} + X_{i+3}) \\ \qquad\qquad f\ i = \text{even numbe} \end{cases}$$

a color transformer for color-transforming image data to provide color-transformed data;

a wavelet-transforming means for wavelet-transforming the color-transformed data to provide a series of wavelet coefficients in different levels of wavelet transformation subbands;

a quantizer for quantizing the wavelet coefficients which fall above a predetermined threshold value to provide a series of quantized wavelet coefficients;

an entropy encoder for entropy encoding the quantized wavelet coefficients to provide coded wavelet coefficients; and a sub-compressor for compressing the coded wavelet coefficients to provide compressed image data, and said data compressor comprises:

a sub-decompressor for de-compressing the compressed image data to provide a series of coded wavelet coefficients;

an entropy decoder for entropy decoding the coded wavelet coefficients to provide a plurality of de-coded wavelet coefficients;

a de-quantizer for de-quantizing the de-coded wavelet coefficients to provide a series of de-quantized wavelet coefficients;

an inverse wavelet transformer for inversely wavelet-transforming the de-quantized wavelet coefficients in different levels of wavelet transformation subbands to provide color-transformed data; and an inverse color transformer for inversely color-transforming the color-transformed data to provide de-compressed image data, wherein the wavelet transformation means includes lifting and scaling means which lifts and scales the color-transformed data according to $$\begin{cases} X_{2n+1} = X_{2n+1} + A(X_{2n} + X_{2n+2}) \\ X_{2n} = X_{2n} + B(X_{2n-1} + X_{2n+1}) \\ X_{2n+1} = X_{2n+1} + C(X_{2n} + X_{2n+2}) \\ X_{2n} = X_{2n} + D(X_{2n-1} + X_{2n+1}) \\ X_{2n+1} = -KX_{2n+1} \\ X_{2n} = \frac{1}{K}X_{2n} \end{cases}$$

thereby providing the series of wavelet coefficients, where X is one of the color-transformed data, n is a one-dimensional pixel index, A=−1.586134342, B=−0.052980118, C=0.882911075, D=0.443506852, and K=1.230174105.

20. The image data compression/de-compression system according to claim 19, wherein the wavelet transformation step includes a plurality of lookup tables.

21. The image data compression/de-compression system according to claim 20, wherein the X is a floating point number to be converted and truncated to an integer according to the lookup tables.

22. A image data compression/de-compression system having at least one of a data compressor and a data de-compressor, said data compressor comprising:

a color transformer for color-transforming image data to provide color-transformed data;

a wavelet-transforming means for wavelet-transforming the color-transformed data to provide a series of wavelet coefficients in different levels of wavelet transformation subbands;

a quantizer for quantizing the wavelet coefficients which fall above a predetermined threshold value to provide a series of quantized wavelet coefficients;

an entropy encoder for entropy encoding the quantized wavelet coefficients to provide coded wavelet coefficients; and a sub-compressor for compressing the coded wavelet coefficients to provide compressed image data, and said data compressor comprises:

a sub-decompressor for de-compressing the compressed image data to provide a series of coded wavelet coefficients;

an entropy decoder for entropy decoding the coded wavelet coefficients to provide a plurality of de-coded wavelet coefficients;

a de-quantizer for de-quantizing the de-coded wavelet coefficients to provide a series of de-quantized wavelet coefficients;

an inverse wavelet transformer for inversely wavelet-transforming the de-quantized wavelet coefficients in different levels of wavelet transformation subbands to provide color-transformed data; and an inverse color transformer for inversely color-transforming the color-transformed data to provide de-compressed image data, wherein the quantizing means quantizes the wavelet coefficients in different levels of wavelet transformation subbands in accordance with:

$$\left\{ Q = \left\lfloor \frac{|X|}{CR} \right\rfloor * \text{sign}(X) \right.$$

where X is one of the wavelet coefficients which falls above a predetermined threshold value, and CR is a user-defined quantizer.

23. A image data compression/de-compression system having at least one of a data compressor and a data de-compressor, said data compressor comprising:

a color transformer for color-transforming image data to provide color-transformed data;

a wavelet-transforming means for wavelet-transforming the color-transformed data to provide a series of wavelet coefficients in different levels of wavelet transformation subbands;

a quantizer for quantizing the wavelet coefficients which fall above a predetermined threshold value to provide a series of quantized wavelet coefficients;

an entropy encoder for entropy encoding the quantized wavelet coefficients to provide coded wavelet coefficients; and a sub-compressor for compressing the coded wavelet coefficients to provide compressed image data, and said data compressor comprises:

a sub-decompressor for de-compressing the compressed image data to provide a series of coded wavelet coefficients;

an entropy decoder for entropy decoding the coded wavelet coefficients to provide a plurality of de-coded wavelet coefficients;

a de-quantizer for de-quantizing the de-coded wavelet coefficients to provide a series of de-quantized wavelet coefficients;

an inverse wavelet transformer for inversely wavelet-transforming the de-quantized wavelet coefficients in different levels of wavelet transformation subbands to provide color-transformed data; and an inverse color transformer for inversely color-transforming the color-transformed data to provide de-compressed image data, wherein the entropy coding means applies a Huffman run-length combined coding by performing a run-length coding on the data and then further compressing the run-length coded data in accordance with a Huffman table having a plurality of predetermined binary codes being associated with each of a plurality of zero run-lengths said plurality of zero run-lengths including the ranges of less than or equal to 8, 9 to 10, 11 to 14, 15 to 22, 23 to 38, 39 to 70, 71 to 134, 135 to 262, 263 to 518, 519 to 1030, 1031 to 2054, 2055 to 4102, 4103 to 8198, 8199 to 16390, and 16391 to 32774.

24. The image data compression/de-compression system according to claim 23, wherein the Huffman table further includes a plurality of predetermined binary codes being associated with each of a plurality of positive and negative integer values.

25. A image data compression/de-compression system having at least one of a data compressor and a data de-compressor, said data compressor comprising:

a color transformer for color-transforming image data to provide color-transformed data;

a wavelet-transforming means for wavelet-transforming the color-transformed data to provide a series of wavelet coefficients in different levels of wavelet transformation subbands;

a quantizer for quantizing the wavelet coefficients which fall above a predetermined threshold value to provide a series of quantized wavelet coefficients;

an entropy encoder for entropy encoding the quantized wavelet coefficients to provide coded wavelet coefficients; and a sub-compressor for compressing the coded wavelet coefficients to provide compressed image data, and said data compressor comprises:

a sub-decompressor for de-compressing the compressed image data to provide a series of coded wavelet coefficients;

an entropy decoder for entropy decoding the coded wavelet coefficients to provide a plurality of de-coded wavelet coefficients;

a de-quantizer for de-quantizing the de-coded wavelet coefficients to provide a series of de-quantized wavelet coefficients;

an inverse wavelet transformer for inversely wavelet-transforming the de-quantized wavelet coefficients in different levels of wavelet transformation subbands to provide color-transformed data; and an inverse color transformer for inversely color-transforming the color-transformed data to provide de-compressed image data, wherein the wavelet transformation means includes lifting and scaling means which lifts and scales the color-transformed data according to $$\begin{cases} X_i = C_1 X_i + C_2(X_{i-1} + X_{i+1}) + C_3(X_{i-2} + X_{i+2}) + C_4(X_{i-3} + X_{i+3}) \\ \qquad \text{if } i = \text{odd number} \\ X_i = C_6 X_i + C_7(X_{i-1} + X_{i+1}) + C_8(X_{i-2} + X_{i+2}) + C_9(X_{i-3} + X_{i-3}) + + \\ \qquad C_5(X_{i-4} + X_{i+4}) \\ \qquad \text{if } i = \text{even number} \end{cases}$$

thereby providing the series of wavelet coefficients, where X is one of the color-transformed data, $C_1$, i is from 1 to 9, A=−1.586134342, B=−0.052980118, C=0.882911075, D=0.443506852, and K=1.230174105, wherein $$\begin{cases} C_1 = -K(1+CB) = -1.172630579 \\ C_2 = -K(A+C+3*ABC) = 0.5912717669 \\ C_3 = -KBC = 0.0575435255 \\ C_4 = -KABC = -0.091271762 \\ C_5 = \dfrac{ABCD}{K} = 0.0261456377 \\ C_6 = \dfrac{1+2AB+2CD+2AD+6ABCD}{K} = 0.6107632047 \\ C_7 = \dfrac{B+D+3*BCD}{K} = 0.2598759232 \\ C_8 = \dfrac{AB+AD+CD+4*ABCD}{K} = -0.074919292 \\ C_9 = \dfrac{BCD}{K} = -0.016483873 \end{cases}$$

26. A image data compression/de-compression system having at least one of a data compressor and a data de-compressor, said data compressor comprising:

a color transformer for color-transforming image data to provide color-transformed data;

a wavelet-transforming means for wavelet-transforming the color-transformed data to provide a series of wavelet coefficients in different levels of wavelet transformation subbands;

a quantizer for quantizing the wavelet coefficients which fall above a predetermined threshold value to provide a series of quantized wavelet coefficients;

an entropy encoder for entropy encoding the quantized wavelet coefficients to provide coded wavelet coefficients; and a sub-compressor for compressing the coded wavelet coefficients to provide compressed image data, and said data compressor comprises:

a sub-decompressor for de-compressing the compressed image data to provide a series of coded wavelet coefficients;

an entropy decoder for entropy decoding the coded wavelet coefficients to provide a plurality of de-coded wavelet coefficients;

a de-quantizer for de-quantizing the de-coded wavelet coefficients to provide a series of de-quantized wavelet coefficients;

an inverse wavelet transformer for inversely wavelet-transforming the de-quantized wavelet coefficients in different levels of wavelet transformation subbands to provide color-transformed data; and an inverse color transformer for inversely color-transforming the color-transformed data to provide de-compressed image data, wherein the color-transformed data includes a luminance component and two chrominance components, and the wavelet-transforming means applies to different components with different numbers of levels of inverse wavelet transformation.

27. The image data compression/de-compression system according to claim 26, wherein four levels of inverse wavelet transformation are applied to the luminance component and three levels of inverse wavelet transformation are applied to the two chrominance components.

28. A image data compression/de-compression system having at least one of a data compressor and a data de-compressor, said data compressor comprising:
   a color transformer for color-transforming image data to provide color-transformed data;
   a wavelet-transforming means for wavelet-transforming the color-transformed data to provide a series of wavelet coefficients in different levels of wavelet transformation subbands;
   a quantizer for quantizing the wavelet coefficients which fall above a predetermined threshold value to provide a series of quantized wavelet coefficients;
   an entropy encoder for entropy encoding the quantized wavelet coefficients to provide coded wavelet coefficients; and
   a sub-compressor for compressing the coded wavelet coefficients to provide compressed image data, and
   said data compressor comprises:
   a sub-decompressor for de-compressing the compressed image data to provide a series of coded wavelet coefficients;
   an entropy decoder for entropy decoding the coded wavelet coefficients to provide a plurality of de-coded wavelet coefficients;
   a de-quantizer for de-quantizing the de-coded wavelet coefficients to provide a series of de-quantized wavelet coefficients;
   an inverse wavelet transformer for inversely wavelet-transforming the de-quantized wavelet coefficients in different levels of wavelet transformation subbands to provide color-transformed data; and
   an inverse color transformer for inversely color-transforming the color-transformed data to provide de-compressed image data.
   wherein the inverse entropy coding means applies an inverse Huffman run-length combined coding by further de-compressing the de-compressed data in accordance with a Huffman table and then performing a run-length coding on the data, the Huffman table having a plurality of predetermined binary codes being associated with each of a plurality of zero run-lengths, said plurality of zero run-lengths including the ranges of less than or equal to 8, 9 to 10, 11 to 14, 15 to 22, 23 to 38, 39 to 70, 71 to 134, 135 to 262, 263 to 518, 519 to 1030, 1031 to 2054, 2055 to 4102, 4103 to 8198, 8199 to 16390, and 16391 to 32774.

29. The image data compression/de-compression according to claim 28, wherein the Huffman table further includes a plurality of predetermined binary codes being associated with each of a plurality of positive and negative integer values.

30. A image data compression/de-compression system having at least one of a data compressor and a data de-compressor, said data compressor comprising:
   a color transformer for color-transforming image data to provide color-transformed data;
   a wavelet-transforming means for wavelet-transforming the color-transformed data to provide a series of wavelet coefficients in different levels of wavelet transformation subbands;
   a quantizer for quantizing the wavelet coefficients which fall above a predetermined threshold value to provide a series of quantized wavelet coefficients;
   an entropy encoder for entropy encoding the quantized wavelet coefficients to provide coded wavelet coefficients; and
   a sub-compressor for compressing the coded wavelet coefficients to provide compressed image data, and
   said data compressor comprises:
   a sub-decompressor for de-compressing the compressed image data to provide a series of coded wavelet coefficients;
   an entropy decoder for entropy decoding the coded wavelet coefficients to provide a plurality of de-coded wavelet coefficients;
   a de-quantizer for de-quantizing the de-coded wavelet coefficients to provide a series of de-quantized wavelet coefficients;
   an inverse wavelet transformer for inversely wavelet-transforming the de-quantized wavelet coefficients in different levels of wavelet transformation subbands to provide color-transformed data; and
   an inverse color transformer for inversely color-transforming the color-transformed data to provide de-compressed image data,
   wherein the de-quantizing means de-quantizes the de-coded wavelet coefficients in different levels of wavelet transformation subbands in accordance with:

$$\{\hat{X}=(|Q|+0.5)*CR* \text{sign}(Q)$$

where Q is one of the de-coded wavelet coefficients, and CR is a user-defined quantizer.

31. A image data compression/de-compression system having at least one of a data compressor and a data de-compressor, said data compressor comprising:
   a color transformer for color-transforming image data to provide color-transformed data;
   a wavelet-transforming means for wavelet-transforming the color-transformed data to provide a series of wavelet coefficients in different levels of wavelet transformation subbands;
   a quantizer for quantizing the wavelet coefficients which fall above a predetermined threshold value to provide a series of quantized wavelet coefficients;
   an entropy encoder for entropy encoding the quantized wavelet coefficients to provide coded wavelet coefficients; and
   a sub-compressor for compressing the coded wavelet coefficients to provide compressed image data, and
   said data compressor comprises:
   a sub-decompressor for de-compressing the compressed image data to provide a series of coded wavelet coefficients;
   an entropy decoder for entropy decoding the coded wavelet coefficients to provide a plurality of de-coded wavelet coefficients;
   a de-quantizer for de-quantizing the de-coded wavelet coefficients to provide a series of de-quantized wavelet coefficients;
   an inverse wavelet transformer for inversely wavelet-transforming the de-quantized wavelet coefficients in different levels of wavelet transformation subbands to provide color-transformed data; and an inverse color transformer for inversely color-transforming the color-transformed data to provide decompressed image data, wherein the inverse wavelet transformation means includes de-scaling and de-lifting means which de-scales and de-lifts the de-quantized wavelet coefficients according to $$\begin{cases} X_{2n} = KX_{2n} \\ X_{2n+1} = \frac{-1}{K}X_{2n+1} \\ X_{2n} = X_{2n} - D(X_{2n-1} + _{2n+1}) \\ X_{2n+1} = X_{2n+1} - C(X_{2n} + X_{2n+2}) \\ X_{2n} = X_{2n} - B(X_{2n-1} + X_{2n+1}) \\ X_{2n+1} = X_{2n+1} - A(X_{2n} + X_{2n+2}) \end{cases}$$

thereby providing the series of wavelet coefficients, where X is one of the de-quantized wavelet coefficients, n is an one-dimensional pixel index, A=−1.586134342, B=−0.052980118, C=0.882911075, D=0.443506852, and K=1.230174105.

32. The image data compression/de-compression system according to claim 31, wherein the inverse wavelet transformation means includes a plurality of lookup tables.

33. The image data compression/de-compression system according to claim 32, wherein the X is recovered according to the lookup tables.

34. A image data compression/de-compression system having at least one of a data compressor and a data de-compressor, said data compressor comprising:

a color transformer for color-transforming image data to provide color-transformed data;

a wavelet-transforming means for wavelet-transforming the color-transformed data to provide a series of wavelet coefficients in different levels of wavelet transformation subbands;

a quantizer for quantizing the wavelet coefficients which fall above a predetermined threshold value to provide a series of quantized wavelet coefficients;

an entropy encoder for entropy encoding the quantized wavelet coefficients to provide coded wavelet coefficients; and a sub-compressor for compressing the coded wavelet coefficients to provide compressed image data, and said data compressor comprises:

a sub-decompressor for de-compressing the compressed image data to provide a series of coded wavelet coefficients;

an entropy decoder for entropy decoding the coded wavelet coefficients to provide a plurality of de-coded wavelet coefficients;

a de-quantizer for de-quantizing the de-coded wavelet coefficients to provide a series of de-quantized wavelet coefficients;

an inverse wavelet transformer for inversely wavelet-transforming the de-quantized wavelet coefficients in different levels of wavelet transformation subbands to provide color-transformed data; and an inverse color transformer for inversely color-transforming the color-transformed data to provide decompressed image data, wherein the inverse wavelet transformation means includes de-scaling and de-lifting means which de-scales and de-lifts the de-quantized wavelet coefficients according to $$\begin{cases} X_i = -C_6 X_i + C_2(X_{i-1} + X_{i+1}) - C_8(X_{i-2} + X_{i+2}) + C_4(X_{i-3} + X_{i-3}) - \\ \qquad C_5(X_{i-4} + X_{i+4}) \\ \qquad \text{if } i = \text{odd number} \\ X_i = -C_1 X_i + C_7(X_{i-1} + X_{i+1}) - C_3(X_{i-2} + X_{i+2}) + C_9(X_{i-3} + X_{i+3}) \\ \qquad \text{if } i = \text{even numbe} \end{cases}$$

thereby providing the series of wavelet coefficients, where X is one of the de-quantized wavelet coefficients, $C_i$, i is from 1 to 9, A=−1.586134342, B=−0.052980118, C=0.882911075, D=0.443506852, and K=1.230174105, wherein $$\begin{cases} C_1 = -K(1 + CB) = -1.172630579 \\ C_2 = -K(A + C + 3 * ABC) = 0.5912717669 \\ C_3 = -KBC = 0.0575435255 \\ C_4 = -KABC = -0.091271762 \\ C_5 = \frac{ABCD}{K} = 0.0261456377 \\ C_6 = \frac{1 + 2AB + 2CD + 2AD + 6ABCD}{K} = 0.6107632047 \\ C_7 = \frac{B + D + 3 * BCD}{K} = 0.2598759232 \\ C_8 = \frac{AB + AD + CD + 4 * ABCD}{K} = -0.074919292 \\ C_9 = \frac{BCD}{K} = -0.016483873 \end{cases}$$

35. A image data compression/de-compression system having at least one of a data compressor and a data de-compressor, said data compressor comprising:

a color transformer for color-transforming image data to provide color-transformed data;

a wavelet-transforming means for wavelet-transforming the color-transformed data to provide a series of wavelet coefficients in different levels of wavelet transformation subbands;

a quantizer for quantizing the wavelet coefficients which fall above a predetermined threshold value to provide a series of quantized wavelet coefficients;

an entropy encoder for entropy encoding the quantized wavelet coefficients to provide coded wavelet coefficients; and a sub-compressor for compressing the coded wavelet coefficients to provide compressed image data, and said data compressor comprises:

a sub-decompressor for de-compressing the compressed image data to provide a series of coded wavelet coefficients;

an entropy decoder for entropy decoding the coded wavelet coefficients to provide a plurality of de-coded wavelet coefficients;

a de-quantizer for de-quantizing the de-coded wavelet coefficients to provide a series of de-quantized wavelet coefficients;

an inverse wavelet transformer for inversely wavelet-transforming the de-quantized wavelet coefficients in different levels of wavelet transformation subbands to provide color-transformed data; and an inverse color transformer for inversely color-transforming the color-transformed data to provide de-compressed image data, wherein the de-quantized wavelet coefficients include a luminance component and two chrominance components, and the inversely wavelet-transforming means applies to different components with different numbers of levels of inverse wavelet transformation.

36. The image data compression/de-compression system according to claim 35, wherein four levels of inverse wavelet transformation are applied to the luminance component and three levels of inverse wavelet transformation are applied to the two chrominance components.

* * * * *